United States Patent [19]

Williamson et al.

[11] 4,435,847

[45] Mar. 6, 1984

[54] AUTOMATIC FREQUENCY CONTROL CIRCUITRY

[75] Inventors: James Williamson, Franklin; Paul G. Crete, Chelmsford, both of Mass.

[73] Assignee: Raytheon Company, Lexington, Mass.

[21] Appl. No.: 650,521

[22] Filed: Jan. 16, 1976

[51] Int. Cl.³ .............................................. H04B 1/16
[52] U.S. Cl. .................................................. 455/260
[58] Field of Search .............. 325/416, 417, 419, 421; 329/124, 125; 343/7 A; 331/18, 30, 34; 455/260

[56] References Cited

U.S. PATENT DOCUMENTS 3,594,651  7/1971  Wolejsza, Jr. .
3,818,347  6/1974  Holsinger .
3,938,148  2/1976  Hobson ................................. 343/7

Primary Examiner—Theodore M. Blum
Attorney, Agent, or Firm—Philip J. McFarland; Joseph D. Pannone

[57] ABSTRACT

Automatic control circuitry for maintaining the frequency of a first local oscillator in a radar receiver at a predetermined offset frequency with respect to the frequency of either transmitted signals from a radar transmitter or echo signals from a target is disclosed. The disclosed circuitry operates as a discriminator when the frequency of the first local oscillator is different from the predetermined offset frequency and as a "phase lock" loop when the frequency of the first local oscillator is the same as the predetermined offset frequency.

5 Claims, 7 Drawing Figures

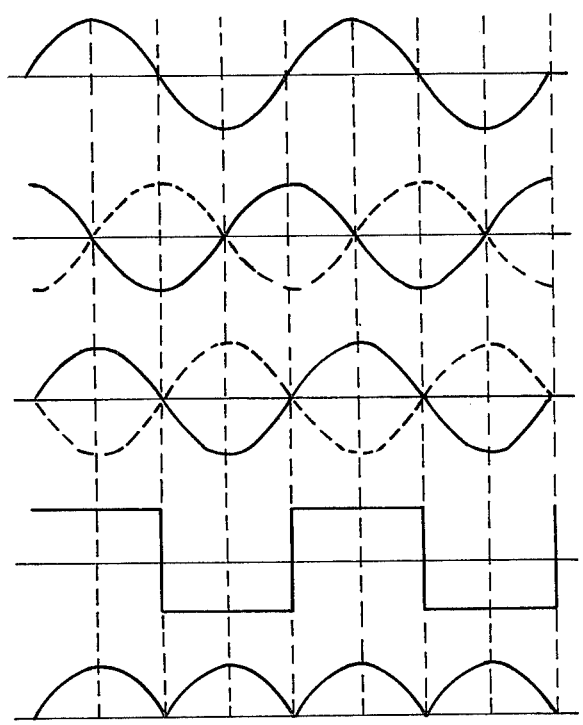
FIG. 2(A)
FIG. 2(B)
FIG. 2(C)
FIG. 2(D)
FIG. 2(E)
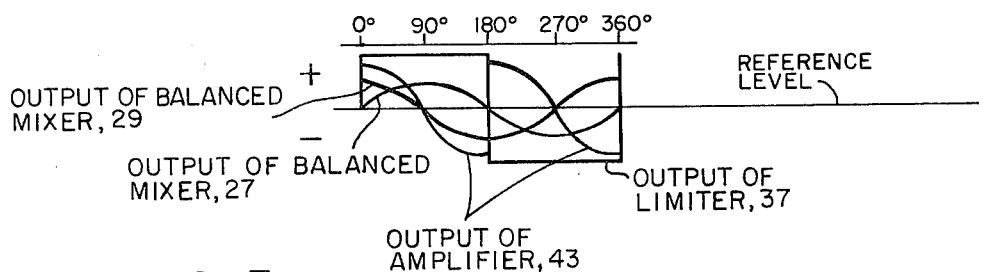
FIG. 3

AUTOMATIC FREQUENCY CONTROL CIRCUITRY

BACKGROUND OF THE INVENTION

This invention pertains generally to radar receivers and particularly to radar receivers used in semiactive missile guidance systems.

It is known in the art that coherence between a radar transmitter in an aircraft or on the ground and a radar receiver in a missile in flight may be achieved by monitoring the frequency at which the radar transmitter is operating to achieve, through the use of any known automatic frequency control (AFC) technique, the requisite control of the frequency of the first local oscillator in a missile in flight. When the requisite control is achieved, it is then possible to tune the first local oscillator so that intermediate frequency echo signals from a selected target fall within a fixed narrow band of frequencies regardless of any Doppler shift impressed on the radar echo signals from such target. As a result, then, proper performance of the guidance system may be obtained even when echo signals from unwanted targets or clutter are present, electronic countermeasures are attempted or signals from several radar transmitters are received.

One particular type of AFC known in the art is the one described in U.S. patent application, Ser. No. 579,171, filed May 20, 1975 by James Williamson, entitled "Adaptive Semiactive Missile Guidance System and Elements Therefor", and assigned to the same assignee as this application. Briefly, the just-referenced arrangement comprises a quadrature demodulator in a missile during flight responsive to intermediate frequency signals from a radar transmitter and to signals from a reference oscillator to produce difference signals which are in quadrature and have the same frequency. When such signals are passed through appropriate filters and are applied to a synchronous detector, a direct current signal whose amplitude and sense are indicative of any offset in frequency between the intermediate frequency signals from the radar transmitter and the signals from the reference oscillator. While the just briefly described arrangement, which in effect is a discriminator operative over a much wider band of difference signals than is possible with a conventional discriminator, is extremely useful in a semiactive missile guidance system, it is subject to the deficiency of any discriminator. That is to say, when the frequency of the intermediate frequency signal from the radar transmitter is equal to the frequency of the reference oscillator, the direct current signal out of the synchronous detector is at a null. Consequently, it is not possible to lock the frequency of the signals out of the reference oscillator to the intermediate frequency signals from the radar transmitter.

SUMMARY OF THE INVENTION

Therefore, it is a primary object of this invention to provide an improved AFC arrangement which is operative over a wide band of frequencies and which, when it is indicated that the frequencies of a particular received signal and of a reference oscillator are the same, automatically changes its mode of operation to that of a phase detector, thereby to provide a sensible control signal under such a condition.

The foregoing object and others to become apparent are attained generally by producing, in a quadrature demodulator, a first and a second difference signal, each one being indicative of the difference, in frequency or phase, between an intermediate frequency signal and a reference signal and then processing, by means of a filter arrangement, the first and the second difference signals ultimately to derive a single error signal, such error signal being a direct current signal having an amplitude and sense indicative either of the difference in frequency (when there is a difference) between the intermediate frequency signal and the reference signal or of the difference in phase (when the frequencies of the intermediate frequency signal and the reference signal are the same) between the intermediate frequency signal and the reference signal.

BRIEF DESCRIPTION OF THE DRAWINGS

For a more complete understanding of this invention, reference is now made to the following description of the accompanying drawings wherein:

FIGS. 2(A) through 2(E) and FIG. 3 are exemplary waveforms at different points in the contemplated AFC arrangement to illustrate how the arrangement operates.

DESCRIPTION OF THE PREFERRED EMBODIMENT

Figure 1:
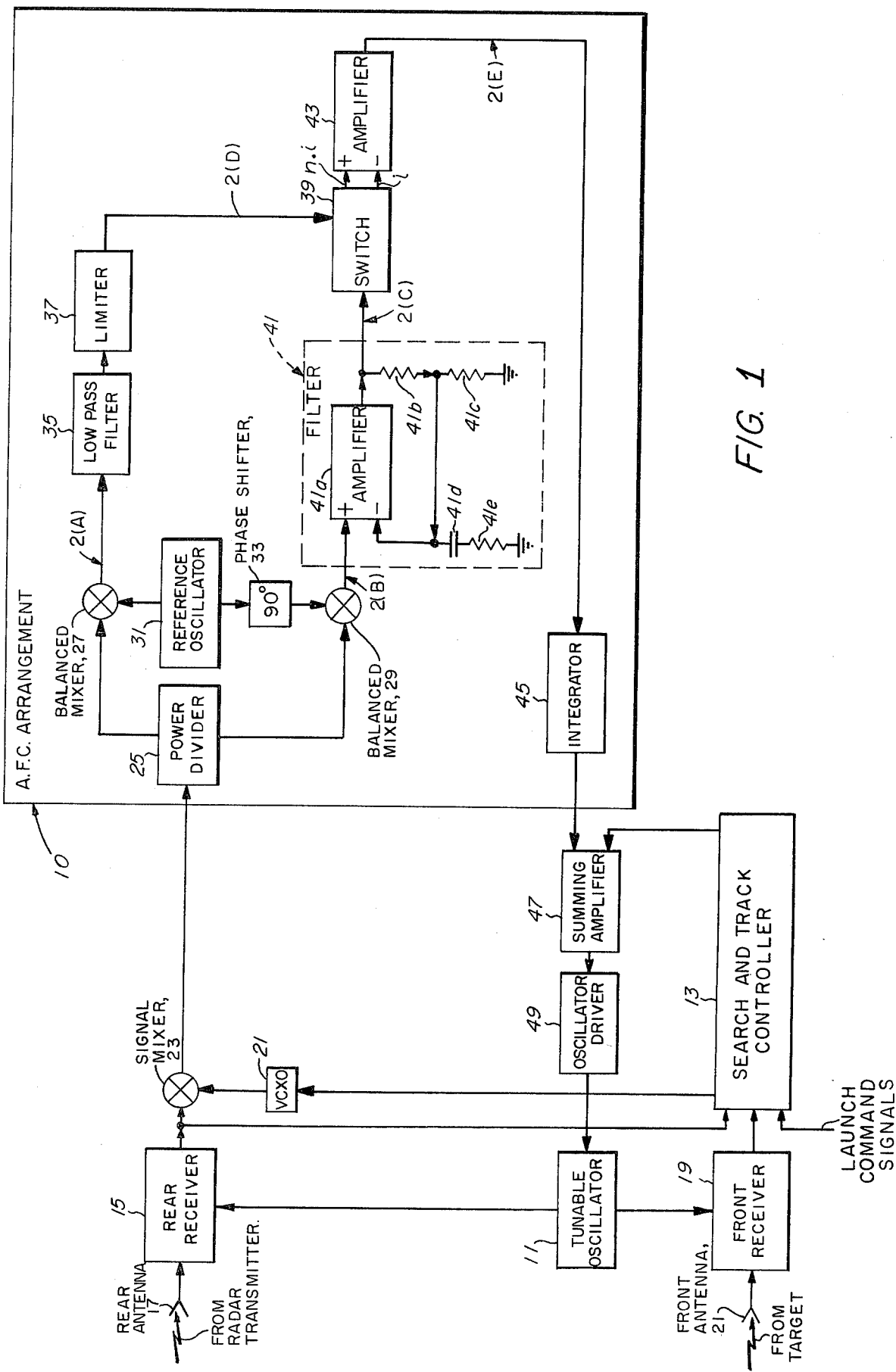
FIG. 1 is a combined block and simplified schematic drawing showing how the contemplated AFC arrangement may be incorporated in a receiver in a missile controlled by a semiactive radar missile guidance system.

Referring now to FIG. 1, it may be seen that the contemplated AFC arrangement 10 is used in a conventional manner in a semiactive radar guidance system. Thus, the illustrated AFC arrangement 10 is arranged to maintain the frequency of operation of a tunable oscillator 11 so that, during flight of a missile (not shown), compensation for any apparent change in either the frequency of a radar transmitter (not shown) or the frequency of target echoes from a target (not shown) is automatically achieved. That is to say, the frequency of the tunable oscillator 11 is maintained by the AFC arrangement 10 and a search and track controller 13 so that the intermediate frequency of a rear receiver 15 (responsive to radar signals from the radar transmitter through a rear antenna 17) and the intermediate frequency of a front receiver 19 (responsive to echo signals from a target through a front antenna 21) is precisely controlled. The search and track controller 13 may, for example, be as shown and described in the application referred to above.

To provide an input signal to the AFC arrangement 10, an intermediate frequency signal from the rear receiver 15 and an intermediate frequency signal representative of the output of the front receiver 19 are passed to a signal mixer 23. The latter signal is generated by a voltage controlled crystal oscillator (VCXO 21) which is controlled by a control signal from the search and track controller 13. As is explained in detail in the application referred to, the control signal to the VCXO 21 is generated in the search and track controller 13 in response to signals out of the rear receiver 15, the front receiver 19 and launch command signals so that: (a) when a target is not being tracked, the frequency of the VCXO 21 is at a predetermined nominal frequency; (b) when a target is being acquired, the frequency of the VCXO 21 is changed from its predetermined nominal frequency in accordance with a selected program; or (c) when a target is being tracked, the frequency of the VCXO 21 is changed to correspond with any tracking error. The output of the signal mixer 23 is passed, through a power divider 25, as shown, to a balanced mixer 27 and to a balanced mixer 29. The second input to the former is taken directly from a reference oscillator 31 and the second input to the latter is taken, through a phase shifter 33 (which shifts phase by 90°) from the same oscillator. It will be appreciated that: (a) if the frequencies of the signals into each one of the balanced mixers 27, 29 are the same, a component of the outputs of each one of such mixers will be a direct current signal whose amplitude and sense are indicative of the difference in phase between input signals; and (b) if the frequencies of the signals into each one of the balanced mixers 27, 29 differ, a component of the outputs of such mixers (hereinafter referred to as difference signals) will be an alternating current signal indicative of the difference in frequency between the frequencies of the signals into the balanced mixers 27, 29. It will be recognized further that, when the frequencies of the signals into each one of the balanced mixers 27, 29 differ, the relative phase between the difference signals out of such mixers is indicative of the relative frequencies of the signals into such mixers. That is to say, the phase of the signal out of the balanced mixer 29 will lag (by 90°) that of the signal out of the balanced mixer 27 if the frequency of the signal out of the reference oscillator 31 is lower than the frequency of the signal out of the power divider 25. If, on the other hand, the frequency of the signal out of the reference oscillator 31 is higher than the frequency of the signal out of the power divider 25, then the phase of the difference signal out of the balanced mixer 29 will lead (by 90°) the phase of the difference signal out of the balanced mixer 27.

The output of the balanced mixer 27 is passed, through a low pass filter 35 and a limiter 37, to a switch 39. With the low pass filter 35 having a cutoff frequency of, say, 40 KHz, it will be apparent that the signal out of the limiter 37 is, so long as the frequency of the signal out of the balanced mixer 27 is less than 40 KHz, will be a square wave having transitions substantially coincident with the zero crossings of the signal out of the balanced mixer 27. When the frequency of the difference signal out of the balanced mixer 27 is greater than 40 KHz, the low pass filter 35 is effective to shift the phase of such signal by substantially 90°. Therefore, the square wave out of the limiter 37 is similarly shifted. Such a square wave, when applied to the switch 39, is effective to cause that element to change its condition periodically so as to connect the output of a filter 41 (to be described) from a line marked "n.i." to a line marked "i". It will be obvious that the switch 39 may be constructed in any one of a number of ways, for example by providing a pair of gated amplifiers, one such amplifier being gated "on" by the positive portion of the square wave out of the limiter 37 and the other being gated "on" by the negative portion of such square wave. The output of the filter 41 would then be applied to both gated amplifiers and the output of one would be connected to the line marked "n.i." and the output of the other would be connected to the line marked "i". The lines marked "n.i." and "i" are connected as shown to the non-inverting input terminal (marked "+") and to the inverting input terminal (marked "−") of an amplifier 43. The output of the latter is connected, through an integrator 45, a summing amplifier 47 and a driver (oscillator driver 49) to the tunable oscillator 11.

The filter 41 comprises an amplifier 41a having a noninverting (+) and an inverting (−) input terminal. The output of the balanced mixer 29 is connected to the noninverting input terminal of the amplifier 41a. The signal into the inverting terminal of the amplifier 41a is taken, through a feedback path made up of resistor 41b, resistor 41c, capacitor 41d and resistor 41e, from the output terminal of the amplifier 41a. The values of the elements in the feedback path here are selected so that: (a) when the frequency of the output of the amplifier 41a is 400 Hz, or less, the impedance of the combination of capacitor 41d and resistor 41e is very much greater, say by a factor of 10, than the impedance of resistor 41c; (b) when the frequency of the output of the amplifier 41a is 40 KHz, or more, the impedance of the combination of capacitor 41d and resistor 41e is very much less, say by a factor of 10, than the impedance of the resistor 41c; and (c) when the frequency of the output of the amplifier 41a is between 400 Hz and 40 KHz, the impedance of the combination of capacitor 41d and resistor 41e changes (in accordance with any change in the output of the amplifier 41a). It will now be recognized that the level of the feedback signal to the inverting input terminal of the amplifier 41a is always equal to the level at the noninverting input. The combination impedance of 41c, 41d and 41e between the noninverting input and ground decreases with increased frequency. Therefore, the output of amplifier 41a increases with frequency (which frequency is analogous to the difference frequency out of the balanced mixer 29) between 400 Hz and 40 KHz and then remains substantially constant.

It will also be recognized that the feedback circuitry for the amplifier 41a controls the phase relative to the phase of the difference signal out of the balanced mixer 29) of the output of that amplifier. Thus: (a) when the frequency of the output of the amplifier 41a is 400 Hz, or less, there is little or no phase shift between the input and the output of the amplifier 41a; (b) when the frequency of the output of the amplifier 41a is between 400 Hz and 40 KHz, there is (substantially) a 90° phase shift between the input and the output of the amplifier 41a; and, (c) when the frequency of the output of the amplifier 41a is above 40 KHz, there is no phase shift between the input and the output of the amplifier 41a. In this connection, it is noted that the values of the elements in the feedback circuitry for the amplifier 41a are selected so that the frequency at which the gain of that amplifier is unity lies between 400 Hz and 40 KHz. As a result, then, another effect of the filter 41 is to produce a proper amount of phase compensation to maintain stability in operation during the transition from the discriminator mode of operation to the "phase lock" mode.

With the foregoing description of the various components making up the illustrated AFC arrangement in mind, reference is now made to FIGS. 2(A) through 2(E) and FIG. 3 to explain the mode of operation of the AFC arrangement 10 of FIG. 1. In FIGS. 2(A) through 2(E) the abscissas of the curves represent time and the ordinates represent amplitude. Each one of the curves further represents, in an exemplary fashion, the waveform existing at the correspondingly marked point in FIG. 1 when the difference frequency of the signals out of the balanced mixers 27, 29 is between 400 Hz and 40 KHz. The full lines in FIGS. 2(B), 2(D) and 2(E) represent the signals which occur when the frequency of the signals out of the power divider 25 is lower than the frequency of the signal out of the reference oscillator 31 and the broken lines in those FIGURES represent the signals which occur when the opposite situation obtains. Thus, the output of the balanced mixer 27 (as shown in FIG. 2(A)) is sinusoidal, with its period being determined by the frequency of the difference signal out of such mixer. Such sinusoidal signal, after passing through the limiter 37, then appears as a synchronous square wave (as shown in FIG. 2(C)). The output of the balanced mixer 29 is shown in FIG. 2(B) to be a cosinusoidal signal, which, after being shifted 90° in passing through the filter 41, is in synchronism with the square wave out of the limiter 37. The switch 39, therefore, is caused to operate in a manner analogous to that of a synchronous detector and alternate half cycles of the output of the filter 41 are connected to the noninverting and inverting input terminals of the amplifier 43. The output of the just-mentioned element then is the pulsating direct current signal shown in FIG. 2(E). Such signal, after integration in the integrator 45, is applied to the oscillator driver 49 to change the frequency of the tunable oscillator 11 finally to null the output of the amplifier 43. It will be noted that, in the situation being discussed, the amplitude of the signal out of the amplifier 43 is (because of the operation of the filter 41 as described above) proportional to the difference frequency of the signal out of the balanced mixer 29.

When the difference frequency of the signals out of the balanced mixers 27, 29 exceeds 40 KHz, synchronism between the inputs to the switch 39 is maintained; however, in this case the square wave (FIG. 2(C)) is shifted 90° and the cosinusoidal wave (FIG. 2(B)) is unshifted. The amplitude of the signal (FIG. 2(E)) out of the amplifier 43 is, however, substantially constant.

It may be seen, therefore, that the described AFC arrangement is operative under the conditions being discussed in a manner analogous to that of a conventional discriminator, except that the operating bandwidth of the present arrangement is much greater.

When the difference frequency of the output of the balanced mixers 27, 29 is driven to a null by the "discriminator" action just described, the AFC arrangement automatically changes to what may be called an automatic phase control, APC, mode of operation. In such mode, the waveform shown in FIG. 3 is of interest. In FIG. 3 the abscissa is the difference in phase between the signals into the balanced mixers 27, 29 and the ordinate is amplitude. It may be seen in FIG. 3 that, if the difference in phase between the signals into the balanced mixers is between 0° and 180°: (a) the output of the balanced mixer 27 is the positive half of a sinusoidal waveform; (b) the output of the limiter 37 is a constant direct current signal; and (c) the output of the balanced mixer 29 is the first half of a cosinusoidal waveform. Under such conditions, the switch 39 is effective to connect (via the filter 41) the output of the balanced mixer 29 to the noninverting input terminal of the amplifier 43. That element then operates to produce the curve labeled "output of amplifier 43". It will be recognized that the output of the amplifier 43, upon being passed through the integrator 45, and the summing amplifier 47 to the oscillator driver 49, ultimately controls the phase of the tunable oscillator 11 to force a null in the output of the amplifier 43. That is to say, the intermediate frequency signal into the balanced mixer 29 is "phase-locked" to the signal out of the reference oscillator 31.

When the difference in phase between the signals into the balanced mixers 27, 29 is between 180° and 360°: (a) the output of the balanced mixer 27 is the negative half of a sinusoidal waveform; (b) the output of the limiter 37 is a constant negative direct current signal; and (c) the output of the balanced mixer 29 is the second half of a cosinusoidal waveform. Under such conditions the switch 39 is effective to connect (via the filter 41) the output of the balanced mixer 29 to the inverting input terminal of the amplifier 43. The output of that amplifier then is the same as if the difference in phase between tthe input signals to the balanced mixer 29 were between 0° and 180°. Consequently, the phase of the tunable oscillator is changed to force a null where the difference in phase between the input signals to the balanced mixer 29 is 270°.

Whether the "phase-lock" between the input signals to the balanced mixer 27 occurs when the difference in phase between the input signals to such mixer is 90° or 270° is immaterial. That is to say, so long as the phase of the tunable oscillator 11 may be forced to a null at either one of two known positions, automatic phase control may be satisfactorily accomplished.

Having described a preferred embodiment of our invention, it will now be obvious to one of skill in the art tthat the gist of our invention lies in the idea of processing the two outputs of a quadrature demodulator in such a manner that a correction signal, indicative of a difference in either frequency or in phase (depending upon existing conditions) of a tunable oscillator from a norm, may be generated to cause the output of such oscillator to be forced to the norm. With this in mind it will be evident that many changes may be made in the preferred embodiment without departing from our inventive concepts. For example, it is obvious that the frequencies at which the illustrated circuitry operates may be changed as desired simply by appropriately changing the reference oscillator and the characteristics of the filters. Further, the invention need not be used only in a semiactive radar guidance system, although it is extremely useful in such a system, but may be used in any heterodyne receiver where it is desired to have the frequency of the first local oscillator offset by a predetermined amount from a receiver signal whose frequency may vary with time. It is felt, therefore, that this invention should not be restricted to its disclosed embodiment but rather should be limited only by the spirit and scope of the appended claims.

What is claimed is:

1. In a heterodyne receiver wherein the frequency of a tunable first local oscillator is to be maintained at a frequency offset by a predetermined amount from the frequency of a received signal, improved frequency control circuitry for such oscillator comprising:
   (a) quadrature detection means, responsive to an intermediate frequency signal corresponding to a received signal and to the output of a reference oscillator, for producing a first and a second difference signal, each one being indicative of a difference in phase between the intermediate frequency signal and the output of the reference oscillator;
   (b) filter means, responsive to the first and the second difference signals out of the quadrature detection means, for converting the first and the second difference signals to, respectively, a control signal and an error signal having the same sense as the control signal;

(c) correction signal generating means, responsive to the control signal and to the error signal out of the filter means, for producing a correction signal having an amplitude and sense determined by the error signal; and, (d) means, responsive to the correction signal out of the correction signal generating means, for changing the phase of the tunable first local oscillator until the second difference signal is indicative of a difference in phase of 90° between the intermediate frequency signal and the output of the reference oscillator.

2. Improved frequency control circuitry as in claim 1 wherein the filter means comprises:

(a) a low pass filter and a limiter for converting the first difference signal out of the quadrature detection means to the control signal; and (b) an amplifier having a frequency dependent negative feedback path for converting the second difference signal out of the quadrature detection means to the error signal.

3. Improved frequency control circuitry as in claim 2 wherein the frequency dependent negative feedback path includes:

(a) a feedback resistor disposed between the output and an input terminal of the amplifier;

(b) a capacitor and a first resistor connected in series between the input terminal of the amplifier and ground; and (c) a second resistor connected between the input terminal of the amplifier and ground.

4. Improved frequency control circuitry as in claim 3 wherein the values of the combination of the first and second resistor and the capacitor are selected so that, at and below the cutoff frequency of the low pass filter, the impedance of the combination is substantially equal to the resistance of the second resistor and, at and above a selected frequency higher than the cutoff frequency of the low pass filter, the impedance of the combination is substantially equal to the resistance of the first resistor.

5. Improved frequency control circuitry as in claim 4 wherein the correction signal generating means comprises:

(a) single-pole double-throw switching means, actuable by the control signal, for connecting the error signal to one or the other of the output terminals of such switching means;

(b) amplifying means having a noninverting and an inverting input terminal; and (c) means for connecting one of the output terminals of the single-pole double-throw switching means to the non-inverting input terminal of the amplifying means and for connecting the second one of the output terminals of the single-pole double-throw switching means to the inverting input terminal of the amplifying means.

* * * * *

UNITED STATES PATENT OFFICE
CERTIFICATE OF CORRECTION

Patent No. 4,435,847     Dated March 6, 1984

Inventor(s) James Williamson and Paul G. Crete

It is certified that error appears in the above-identified patent and that said Letters Patent are hereby corrected as shown below:

On the title page:

Below the title of the invention, insert:

The Government has rights in this invention pursuant to Contract No. N00019-76-C-0190 awarded by the Department of the Navy.

Signed and Sealed this

Sixteenth Day of October 1984

[SEAL]

Attest:

Attesting Officer

GERALD J. MOSSINGHOFF

Commissioner of Patents and Trademarks